United States Patent
Mao et al.

(10) Patent No.: US 9,414,115 B1
(45) Date of Patent: Aug. 9, 2016

(54) USE OF NATURAL USER INTERFACE REALTIME FEEDBACK TO CUSTOMIZE USER VIEWABLE ADS PRESENTED ON BROADCAST MEDIA

(71) Applicants: Teresa Mao, Sunnyvale, CA (US); Abbas Rafii, Sunnyvale, CA (US)

(72) Inventors: Teresa Mao, Sunnyvale, CA (US); Abbas Rafii, Sunnyvale, CA (US)

(73) Assignee: AQUIFI, INC., Palo Alto, CA (US)

( * ) Notice: Subject to any disclaimer, the term of this patent is extended or adjusted under 35 U.S.C. 154(b) by 0 days.

(21) Appl. No.: 14/671,282

(22) Filed: Mar. 27, 2015

Related U.S. Application Data

(60) Provisional application No. 61/972,077, filed on Mar. 28, 2014.

(51) Int. Cl.
| | |
|---|---|
| H04N 21/442 | (2011.01) |
| H04N 21/81 | (2011.01) |
| H04N 21/24 | (2011.01) |
| H04N 21/25 | (2011.01) |
| H04N 21/2668 | (2011.01) |
| H04N 21/258 | (2011.01) |
| H04N 21/466 | (2011.01) |
| H04N 21/45 | (2011.01) |

(52) U.S. Cl.
CPC ..... *H04N 21/44218* (2013.01); *H04N 21/2407* (2013.01); *H04N 21/251* (2013.01); *H04N 21/25891* (2013.01); *H04N 21/2668* (2013.01); *H04N 21/4532* (2013.01); *H04N 21/4667* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 2008/0059390 A1 | 3/2008 | Cox et al. | |
| 2011/0267456 A1 | 11/2011 | Adermann | |
| 2012/0072939 A1 | 3/2012 | Crenshaw | |
| 2012/0124604 A1* | 5/2012 | Small | H04N 21/4223 725/12 |
| 2012/0204202 A1 | 8/2012 | Rowley et al. | |
| 2012/0324494 A1* | 12/2012 | Burger | H04H 60/33 725/12 |
| 2013/0211924 A1* | 8/2013 | Yuill | G06Q 30/0277 705/14.72 |

* cited by examiner

*Primary Examiner* — Omar S Parra
(74) *Attorney, Agent, or Firm* — Michael A. Kaufman, Esq.

(57) ABSTRACT

A sponsor of ads included in media content broadcast to devices by a media broadcast system for viewing by users can receive realtime feedback from users indicative of user evaluation of the presently broadcast and viewed ad. User devices anonymously acquire, process, analyze and broadcast user responses to broadcast ads viewed on the device, the responses preferably made with natural user gestures. User responses broadcast from the device are received by the media broadcast system. Ad sponsors may the customized the ad and/or future ads for the user based upon feedback and, if present, a user history profile. Broadcast ads can allow user to preselect desired ads by interacting with sponsor logos or icons presented on the device. Gesture data can be acquired, processed and broadcast to the media broadcast system for latent, incomplete, user responses, and for responses made during non-ad portions of the broadcast media.

26 Claims, 11 Drawing Sheets

USE OF NATURAL USER INTERFACE REALTIME FEEDBACK TO CUSTOMIZE USER VIEWABLE ADS PRESENTED ON BROADCAST MEDIA

RELATIONSHIP TO CO-PENDING APPLICATION

This application is a continuation of applicant's U.S. provisional patent application Ser. No. 61/972,077, filed on 28 Mar. 2014, entitled "Customizing Ads for Gesture User", which provisional application is incorporated herein by reference.

FIELD OF THE INVENTION

The invention relates generally to customizing advertising (ads) that are broadcast as part of the content from a media service provider to a user such that over time ads more likely to be relevant and of actual interest to the user are presented for viewing. The media broadcasting may be via cable, e.g., Internet service, cable TV, or wireless, especially if a user employs a portable or mobile device to view the broadcasts. Such techniques and methods have varying degrees of complexity, cost, and demand upon the user. Ideally the broadcast advertiser would like to see correlation between user responses and specific segments of individual ads.

BACKGROUND OF THE INVENTION

Ads are an important and vital source of income for media service providers whose broadcast content includes advertisements intended to generate revenue from viewers. Consumers have been subjected to viewing broadcast ads since the earliest days of TV. Initially the ads were broadcast to a wide audience, many of whose members did not care for the ad or its subject matter. Sometimes the ads are randomly generated, but the results are often hit and miss in terms of user appreciation of specific ads. Sometimes the broadcasting advertiser will make assumptions about the viewing audience and attempt to target the ad. For example, ads broadcast during content such as a football game may feature products and services more likely to appeal to adult males, the presumed majority audience. However ads based upon presumed demographics among the viewing audience can be ineffective. In some prior art systems, a purchasing history of specific viewers will be known to the broadcast advertising sponsor, and viewer-user profiles can be constructed from the historical data, perhaps what type of books the viewer (or user) purchased. Using assumptions of what ads the user might actually enjoy viewing, ads presumably can be more intelligently, tailored or customized for specific users. However such assumptions may be wrong. For example what is broadcast based upon a user profile may be an ad for a product that viewing has already purchased, or purchased and disliked. Further it will be appreciated that in such systems, a loss of user anonymity exists, and this may not be acceptable to all users. In some instances an ad service company may undertake research and select and target ads that a broadcast service provider should include in specific broadcast content.

The cost and complexity of systems to detect and communicate user responses to viewed ads to a broadcasting advertiser should be low, yet in many prior art systems such is not the case. Further, responses to viewed ads should not require any substantial effort on the part of the user. Yet may prior art systems involve rating-type hardware boxes connected to the user's TV receiver, with a requirement that a user press one of several buttons, to quantize user interest in a specific ad now being broadcast. The user responses may be stored and communicated to the broadcasting advertiser, perhaps through the user's cable TV network.

In recent years an increasingly large number of users view broadcast entertainment media on portable or handheld smart devices such as tables, smartphones, and the like rather than on conventional TV receivers. Consequently it can be challenging for a broadcast sponsor to intelligently direct ads in content to this substantial portion of media viewers, whose user location may change hour-by-hour thanks to the portability of modern handheld smart devices.

What is needed is a method and system to enable a sponsor or advertiser to present ads to users as part of a media broadcast, where users may view such media using portable handheld devices. Preferably user response to ads is acquired using inexpensive, low complexity devices that require lithe or no effort by the user to communicate responses to ads presented on the device. Preferably user responses should be in the form of natural user gestures, perhaps augmented by user made sounds, e.g., "yeah", "no", "boo", etc. Preferably acquisition of user responses should at each stage of the acquisition process automatically preserve and protect unique user identity such that user participation in responding to ads is entirely inherently anonymized with respect to user identity.

The present invention provides such systems, and methods for implementing such systems.

SUMMARY OF THE PRESENT INVENTION

The present invention provides a method and system to customize user viewable ads that are presented by an advertising sponsor as part of broadcast media content. A user views the ads on the display screen of an electronic device, which device can detect user responses to the ads. The user responses are made preferably using natural user gestures that are acquired by the device, processed, and broadcast to the media broadcaster in realtime. Within the device and as broadcast from the device, data obtained from the acquired user responses is devoid of information that could compromise user anonymity. The device acquisition system preferably includes an optical system that can sense natural user gestures made in (x,y,z) space in a three-dimensional hover zone that images at least a portion of the user, perhaps a hand, a finger, the head. Exemplary such gestures may include thumbs up, thumbs down, "V" for victory, head shaking, head nodding, etc. Optionally user utterances, words, sounds, can also be detected in response to the ads, e.g., "boo", "yay", "hurrah", etc.). Explicit words uttered by the user may be identified using a speech recognition module within the device, and used to augment gesture recognition. If the device is portable and hand holdable, inclusion of a gyro-accelerometer sensor enables detection of mechanical gestures as the user manipulated the device, perhaps shaking, tilting, to respond to broadcast ads. The device processes user responses substantially in realtime and broadcasts the responses to the broadcast media sponsor, perhaps via a server or the cloud.

At the broadcaster portion of the system, processed gesture data from the user device is received and analyzed to determine effectiveness of the just broadcast media ad. Using the gesture data feedback the sponsoring advertiser will seek to make the ad and continuing ads user-centric for the user. So doing is beneficial to the sponsor or advertiser because ads in the broadcast media content will be more effective and result in user purchases because the ads are of interest and probably enjoyable to the user. Further, such customized ads benefit the user who will see more ads in broadcast media content that are relevant and of interest, and fewer ads that are of little or no interest.

In practice a media broadcast system broadcasts wirelessly or otherwise content that includes sponsor's ads to a user viewable display, perhaps the display screen on a TV, or on the display of a mobile handheld device including devices such as a portable tablet, a smartphone, even devices commonly called 'Internet of Things' (IoT), etc. The user device includes an acquisition system that can acquire natural user gestures made in the presence of the device, responsive to ads presented on the device display, including for example thumbs up/thumbs down gestures to indicate approval/disapproval, head shaking or nodding. The acquisition system may also enable the user to respond audibly and, in the case of a handheld device, mechanically by manipulating the device. In some embodiments the user can respond interactively with the presented ad, perhaps altering the ad simply by pointing a finger towards the device display. The user responses acquired by device and processed within the device and are sent to the broadcast advertiser, preferably in realtime, using various techniques and methods. Gesture and other data acquired by, processed, and transmitted from the device are devoid of information useable to discern the actual identity of the user whose responses were acquired.

Upon receiving the device processed user responses, the media broadcast system can analyze the responses and attempt to customize what may be the remaining portion of the presently broadcast ad, and subsequent ads for viewing or listening by this user. In this fashion a set of user-concentric ads can be developed and broadcast, to the benefit of the sponsor of the ads as well as to the recipient viewer. The invention enables multiple users to view the same content and same ad, yet respond differently using their devices, and subsequently see different customized ads, relative to other users.

Embodiments of the invention include ads presented on a device that explicitly prompt the user to respond, ads that function iteratively with user response including enabling the user to alter in realtime what is presented on the device display. Some embodiments can modify ads based upon detected location of the user device. Embodiments to actively rank potential ads, including use of latent clues obtained from the user pointing toward an ad presentation but not necessarily taking further action, and embodiments enabling a user to gesture that a presented ad should be save for later presentation and potential use.

Other features and advantages of the invention will appear from the following description in which the preferred embodiments have been set forth in detail, in conjunction with their accompanying drawings.

DETAILED DESCRIPTION OF THE PREFERRED EMBODIMENTS

Figure 1A:
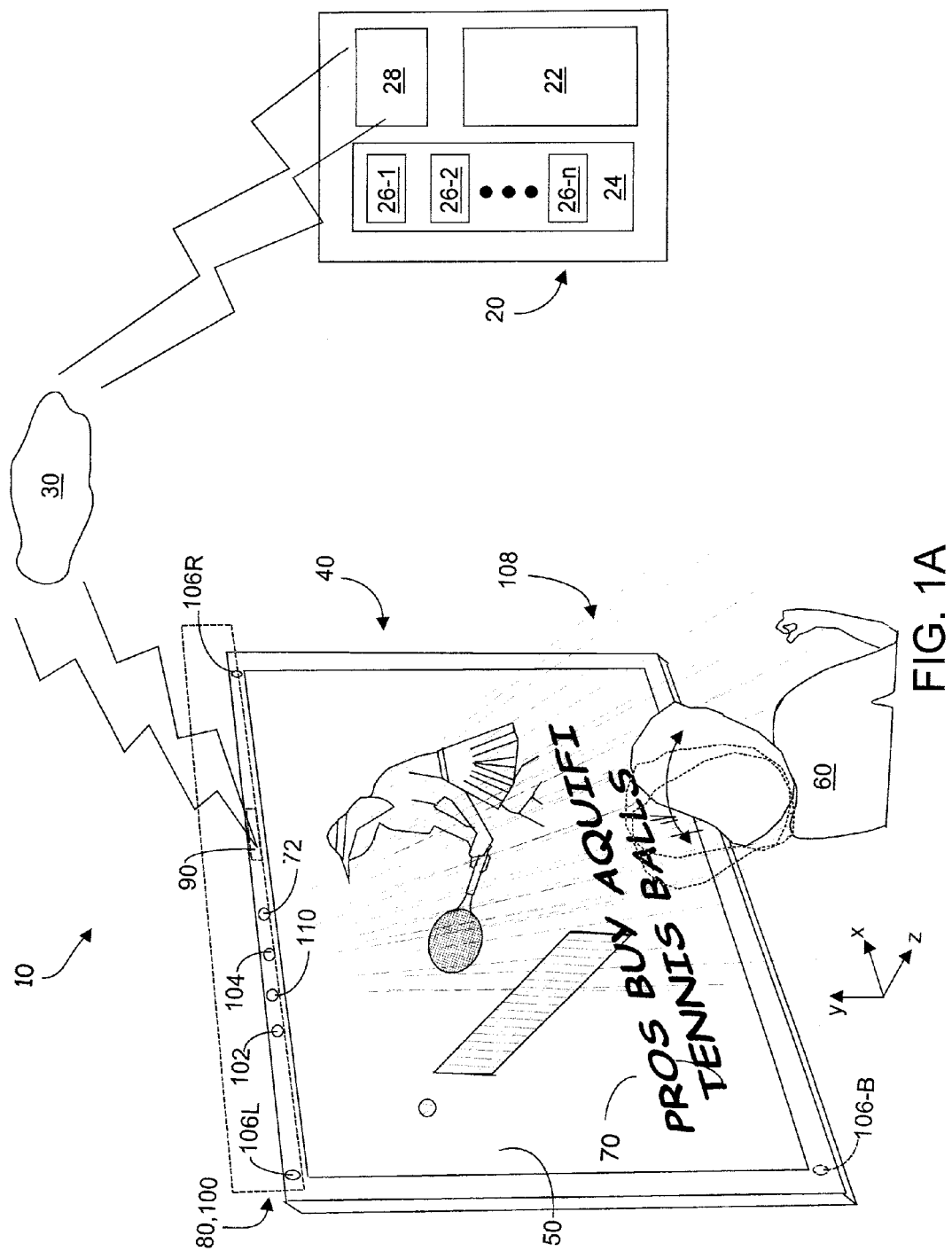
FIG. 1A depicts an overall system enabling users to cause customization of media broadcast ads they view on a device by responding to the ads with natural user interface gestures, and communicating processed responses to the media broadcaster who can vary ad presentation to the user to enhance ad effectiveness and user enjoyment of the ad, according to embodiments of the present invention.
Figure 1B:
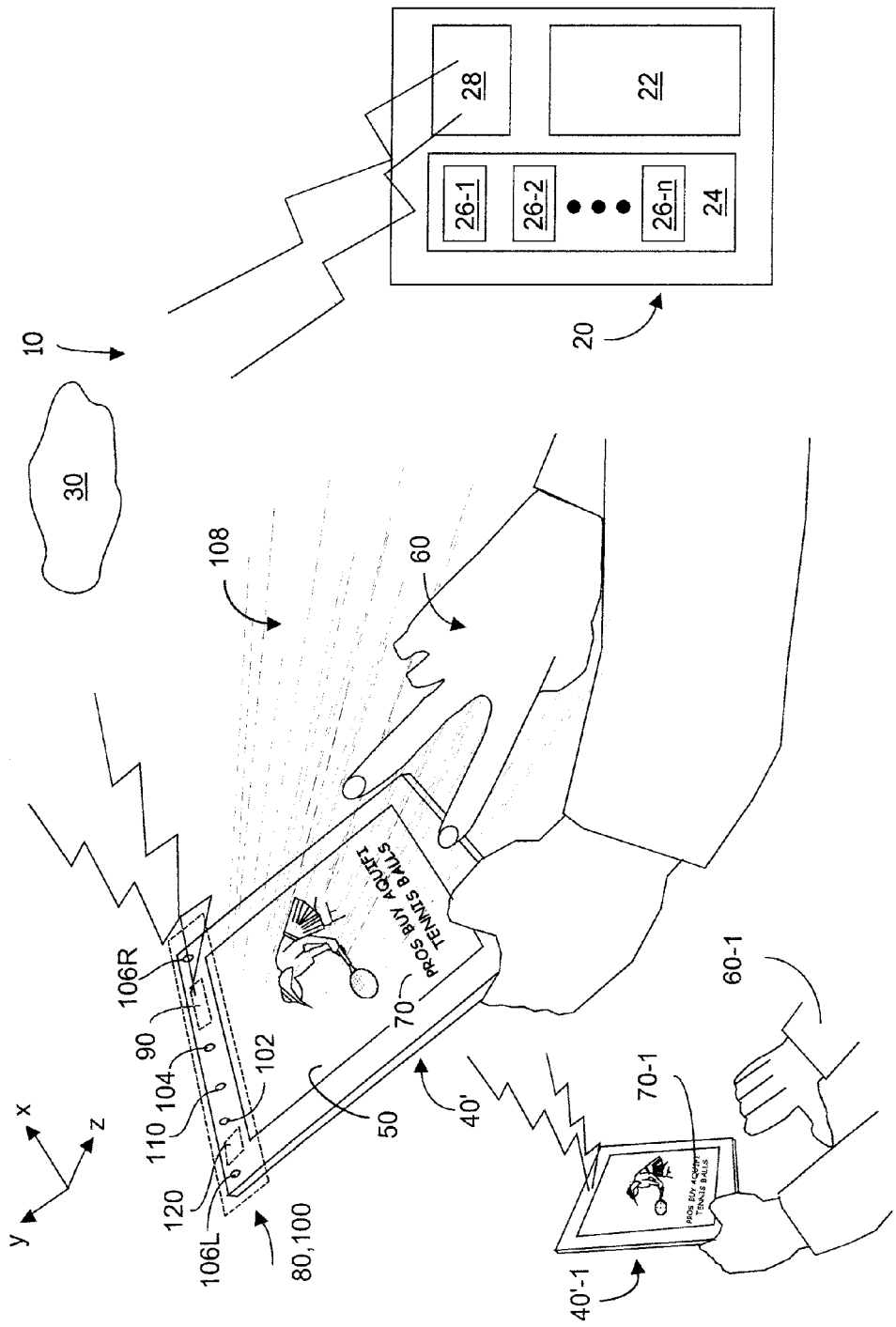
FIG. 1B depicts an overall system similar to that of FIG. 1A, depicting two devices that are portable and can further recognize user responses made by physically manipulating the device, according to embodiments of the present invention.

FIG. 1A and FIG. 1B depict an overall system 10, according to embodiments of the present invention that includes a media broadcasting system 20 that generates and transmits (zig-zag lines) media, perhaps via cloud or server 30, to at least one device 40 (FIG. 1A), 40', 40'-1 (FIG. 1B), and can receive responses from the devices, perhaps via cloud or server 30. As such, communications in FIG. 1A and FIG. 1B depicted with zig-zag lines is bilateral communication, as will be described herein in that media broadcast system 20 and devices 40 can both send and receive information, optionally via cloud or server 30. Such bilateral transmission may be wirelessly, e.g., Bluetooth, WiFi, IR, etc., or may be via wire or cable. Device 40 includes a display screen 50 allowing a user 60 to view the broadcast media, here shown as including an ad 70 promoting a brand of tennis balls, perhaps endorsed by the female tennis player shown. Thus it is understood that the term media as used herein may include an ad or ads broadcast as part of the media, typically as the sponsor. In FIG. 1A device 40 is stationary, perhaps without limitation a smart TV receiver, entertainment system, a smart top box, a computer. By contrast in FIG. 1B device 40', 40'-1' may be without limitation a portable, typically handheld, device, perhaps a tablet, a smartphone, an IoT device, a laptop computer. But for physical size, the general functionality of device 40 in FIG. 1A and device 40', 40'-1 in FIG. 1B is substantially identical. Henceforth, the nomenclature device 40 as used herein will be understood to include a non-portable device such as device 40 in FIG. 1A, as well as a portable or handheld device such as 40', 40'-1 as shown in FIG. 1B. Handheld devices 40', 40'-1 are generally battery powered and embodiments of the present invention can control processing duty cycle of devices 40', 40'-1 to preserve device resources, including battery power.

Media broadcasting system 20 broadcasts media that includes ads such as 70 presented and viewed on device 40. Upon viewing the broadcast ads on device 40, user 60 is encouraged to respond, favorably or otherwise, using natural user gestures. These gesture responses (and optional audible responses, and for device 40' optional mechanical responses) are detected by device 40, processed for interpretation, and broadcast to media broadcasting system 20. Substantially in realtime, which term as used herein means as fast as is practicable, and may be on the order of seconds in practice.

The functionality of media broadcasting system 20 is described later herein with respect to FIG. 3.-FIG. 8. In overview, system 20 includes a processing and control system 22, memory 24 storing executable routines such as 26-1, 26-2, . . . 26-*n* executable by system 22 to carry out the functions of system 20, and an I/O system 28 that provides broadcast and receive transmissions to and from devices such as 40, as well as server(s) or cloud systems 30. Media broadcasting system 20 can analyze such response to alter this or subsequent ads for the user and/or allow the user to interact with the ads using device 40. The benefit to the sponsor or advertiser paying for the media broadcast is that the user will probably pay more attention to and preferably enjoy viewing ads he/she has helped select, which represents good return for the sponsor's money. The benefit to the user is that he/she helps select and sees ads that may actually be of use or interest. According the present invention, the burden and risk upon the user who is encouraged to interact with the ads preferably is minimal, to promote user interaction.

The nature and function of device 40 will be described first, after which media broadcasting system 20 will be described. Preferably the user interacts with broadcast ads displayed on device 40 using natural user gestures, which are gestures the user might normally make to express opinion. Exemplary such gestures include without limitation indicating approval or liking with vertical head nodding, a "V" for victory gesture, perhaps a thumbs up hand gesture, expressing disagreement with sideways head movement, perhaps a thumbs down hand gesture. For example in FIG. 1A user 60 is shown shaking her head sideway, to indicate displeasure, whereas in FIG. 1B, user 60 is making a "V" for victory gesture to indicate approval, and user 60-1 in the lower left portion of FIG. 1B is making a thumbs down gesture to indicate disapproval. As described later herein device 40 may also allow user interaction with audible utterances and/or mechanical movement of handheld device 40' in FIG. 1B. Thus the burden or learning curve for user to interact with ads is extremely low; the user simply reacts and he/she might normally do. Further device 40 acquires and processes user interaction data such that user anonymity exists at each stage of the process, including data that is broadcast by device 40. Not only is anonymity assured, but privacy in the sense that user 40 may choose to view and respond to ads with device 40 in a state of very casual dress, without fear of actual images of the viewer being preserved within or being broadcast from the device. As such data within and broadcast from device 40 is devoid of data that might uniquely identify the user whose responses were acquired, processed, and broadcast. This aspect of the present invention encourages user participation free from risk of hacker intervention of data that might uniquely identify the user. It is understood from FIG. 1B that multiple users may simultaneously view the same broadcast with the same ads but respond differently to the ads. Similarly multiple users may of course view the same broadcasts but with different ads, customized to the particular user. Also, multiple users may of course view different broadcasts with the same ads.

Device 40 includes an acquisition system 80 and a processor-controller-input/output (I/O) system 90. Acquisition system 80 preferably includes an optical acquisition system 100 that may include a time-of-flight (TOF) 102, a structured light system 104, but more preferably at least one two-dimensional camera system 106, e.g., cameras 106L, 106R, 106B. Phantom lines in FIG. 1A and FIG. 1B denote the three-dimensional frustum-shaped hover zone 108 defined by the overlapping fields of view (FOV) of cameras 106L, 106R. Cameras 106L, 106R acquire gesture images of target objects user 60, within hover zone 108. The display screen of device 40, 40', 40'-1 need not be a touch screen as gestures are acquirable in (x,y,z) space, where z>0. The terms target object and user may be used interchangeably herein, where a target object is at least a portion of the user, e.g., perhaps the head, a hand, a fingertip, etc. Acquisition system 80 optionally further includes a microphone 110, and for portable device 40' a gyro-accelerometer sensor 120. Microphone 110 allows user 60 to emit audible opinions concerning a displayed ad, including without limitation "yes", "yay", "no", "boo", etc. Gyro-accelerometer sensor 120 enables user manipulation of portable device 40' to express opinions mechanically, including without limitation manipulating device 40' itself, such as shaking or rotating left-right to indicate "no", shaking or rotating up-down to indicate "yes", etc. Processor-controller-input/output (I/O) system 90 receives user response input from acquisition system 80, processes and analyzes such input to recognize the probable intended user response, and transmits the response to media broadcasting system 20, perhaps via cloud or server 30, or indeed via wire in some applications. Media broadcasting system 20 receives and analyzes the user responses transmitted by device 40, and determines intelligently what if any changes to make to the currently presented ad, e.g., 70, or to the next intended ad for the user. As described further herein, media broadcasting system 20 has many analytic and diagnostic tools with which to best tailor further ads to the user, including ads that may, be user interactive anticipating in the dynamic review of broadcast ads is minimal.

As noted above, optical system 100 may include a time-of-flight (TOF) system 102, a structured light system 104, or preferably at least a pair of spaced-apart two-dimensional cameras 106L, 106R, 106B. TOF systems 102 are described in numerous U.S. patents awarded to Canesta, Inc., formerly of Sunnyvale, Calif. Such TOF systems emit active optical energy and can determine distance (x,y,z) to the surface of a target object, e.g., at least a portion of user 60. This information is acquired by timing how long it takes for emitted optical energy to be reflected back from the surface of the target object, or by examining phase shift in the reflected-back emitted optical energy. Structured light systems 104 are also known in the art. Such systems project a light pattern onto a target object, e.g., at least a portion of user 60, and try to discern from the distortion on the pattern characteristics of the surface of the target object. Unfortunately TOF systems 102 and structured light systems 104 are not good candidates for optical acquisition system 100, especially for inclusion in handheld device 40'. Both systems can be relatively costly with fairly high power consumption, large form factors and heat dissipation requirements. Further such systems require customized ICs, and suffer performance degradation in the presence of strong ambient light.

Preferably optical acquisition system 100 is implemented with at least two spaced-apart two-dimensional cameras such as 106L, 106R. Such systems have been developed by Imimtek, Inc., now Aquifi, Inc. of Palo Alto, Calif., and are described in US patents including U.S. Pat. No. 8,723,789, U.S. Pat. No. 8,840,466, U.S. Pat. No. 8,686,943, U.S. Pat. No. 8,773,512, U.S. Pat. No. 8,854,433, and U.S. Pat. No. 8,836,768. These patents (hereinafter denoted as the Aquifi patents) describe in far more detail than need be set forth here useful methods and systems to acquire two-dimensional data from user gestures including natural user gestures. The patents describe using inexpensive generic two-dimensional cameras 106L, 106R, and processing acquired such optical data to rapidly achieve three-dimensional depth data as to the target object being imaged, e.g., at least a portion of user 60 in FIG. 1A, FIG. 1B. Such described methods include use of epipolar geometry and epipolar lines, and rectified system analysis to facilitate calculation of reconstructed three-dimensional depth maps. Advantageously use of the Aquifi, Inc. methodology results in an expensive system that can be mass produced using generic components having small form factor and power and dissipation requirements. Further, performance of such system is actually enhanced in the presence of strong ambient light. The contents of the above-enumerated Aquifi patents are referred to and incorporated herein by reference for their detailed descriptions of acquiring two-dimensional data and further processing such data to quickly realize three-dimensional depth data regarding the imaged target object. Accordingly a somewhat abbreviated description of optical acquisition system 100 will be given herein to aid in understanding dynamic customization of broadcast media ads, according to embodiments of the present invention.

In overview, gesture acquisition as described in the referenced Aquifi patents enables realtime detection of natural user gestures including hand and finger positioning and movement in (x,y,z) space, e.g., in response to an ad displayed on a device that includes gesture acquisition, processing, and transmitting functionality. Physical contact with the device display screen is not required for gesture recognition per the Aquifi patent technology. The target object, e.g., a hand or finger in this example, may be tracked as to location, orientation, and velocity, relative to the device. This functionality enables the user to interact with what is displayed on the device, e.g., broadcast content including ads, for example by pointing a finger at a portion of the display screen, perhaps causing a displayed element to move proportionally to the detected user finger movement in (x,y,z) space. Interaction may include expressing an opinion as to an ad, or actually interacting with what is displayed so as to control the display in realtime, perhaps by using a finger to point at different elements on the device display. Processing per the referenced Aquifi patents enables inexpensive and rapid tracking of the user object in a three-dimensional hover zone space generally within view of the device, with rapid recognition of the gesture made by the user. Gestures may be inexpensively acquired using generic two-dimensional cameras whose imagery is rapidly processed to recognize user gestures acquired optically by the cameras. In some embodiments of the present invention the user can interact with and control elements on the device display screen using gestures, for example causing the displayed content to zoom, change color, or reposition including repositioning relative to velocity of the imaged user hand or finger.

Figure 1C:
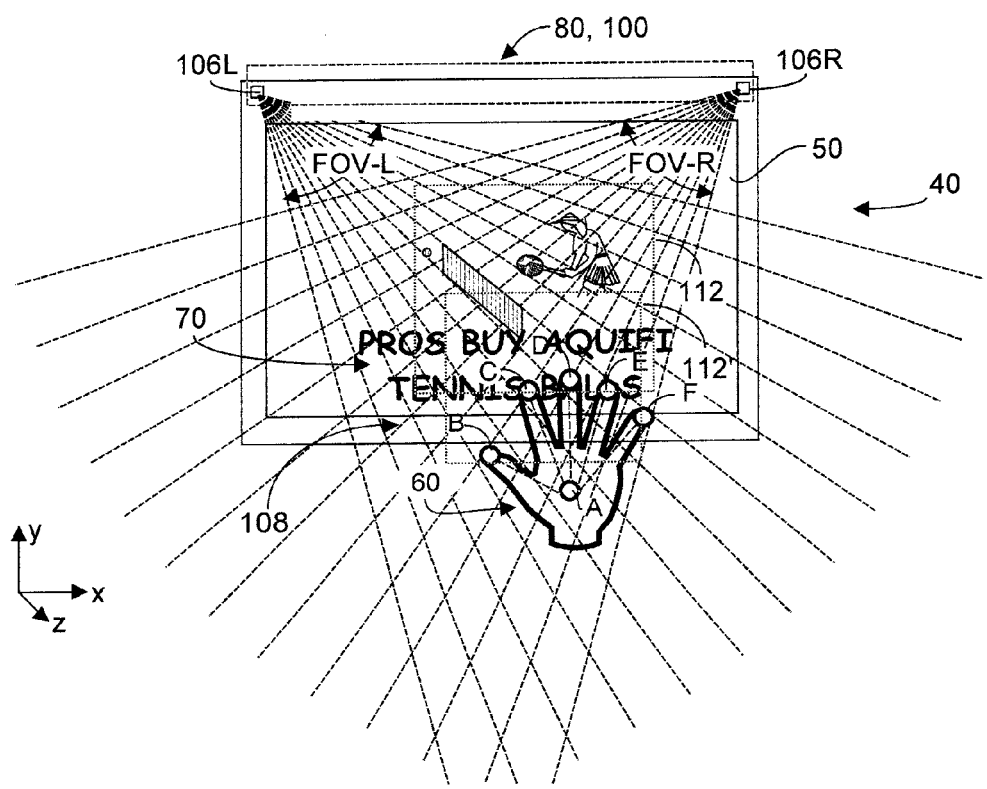
FIG. 1C is a front view of a device such as shown in FIG. 1A or FIG. 1B whose acquisition system includes at least two two-dimensional cameras used to acquire natural user gestures responsive to user viewing of broadcast ads, according to embodiments of the present invention.

In FIG. 1C, acquisition system 80 has an optical acquisition system 100 that includes two-dimensional cameras 106L, 106R rigidly attached to the front of device 40. Preferably these are a pair of inexpensive generic two-dimensional inexpensive cameras that acquire two-dimensional image data from the two vantage points of cameras 106L, 106R. Embodiments of device 40/40' may be implemented with two OmniVision model OV7740 VGA two-dimensional cameras 106L, 106R; see www.ovt.com. This commercially available camera costs less than about $1/camera in high quantity and has adequate horizontal and vertical FOVs for gesture sensing according to the present invention. In high quantity, unit price of such cameras can be less than $1. The cameras are small and the form factor for the cameras and associated processor-controller-I/O system 90 is on the order of a $cm^3$ or so. The earlier cited Aquifi patents reference procedures regarding use of intrinsic and extrinsic camera parameters, and calibration and registration of the cameras with respect to device 40/40' and with respect to each other.

FIG. 1C shows user object 60, here the user's right hand, within hover zone 108, defined by the intersection of FOV-L, FOV-R for respective cameras 106L, 106R. A plurality of planes may be defined within hover zone 108, such as planes 112, 112'. The A, B, C, D, E, F letters denote landmark points, which as described in the cited Aquifi patents are used to skeletonize imaged target objects such as user hand 60. Thus hand 60 in FIG. 1C is represented as five lines connecting centroid landmark A with the tips of the thumb and fingers, B, C, D, E, F, almost in X-ray fashion. As described in those patents, an imaged target object within a plane within the hover zone is skeletonized to perhaps a dozen or so landmark points, which facilitates rapid reconstruction of three-dimensional date using the relatively sparse set of landmark point date in the two-dimensional imagery acquired by cameras 106L, 106R, typically at a 30 frame/sec or perhaps 60 frame/sec frame rate. In essence the user object hand is represented in skeletal or reduced form, in this case to five lines emanating from centroid landmark A and terminated at the distal end of the thumb (landmark B), the distal end of the forefinger (landmark C), the distal end of the middle finger (landmark D), the distal end of the ring finger (landmark E), and the distal end of the little finger (landmark F). Skeletal images are compared against system 90 stored known gesture data image, e.g., a hand making a "V for victory" gesture, a hand making a thumb-up or a thumb-down gesture, etc. The result is that the two-dimensional camera-captured (or acquired) images are examined by processor system 90 only for skeletal gesture information rather than many, many full image points. This enables processing perhaps only a dozen image points, e.g., A, B, C, D, E, F in FIG. 1C to rapidly and successfully reconstruct (x,y,z) three-dimensional locations of the imaged target object.

Figure 1D:
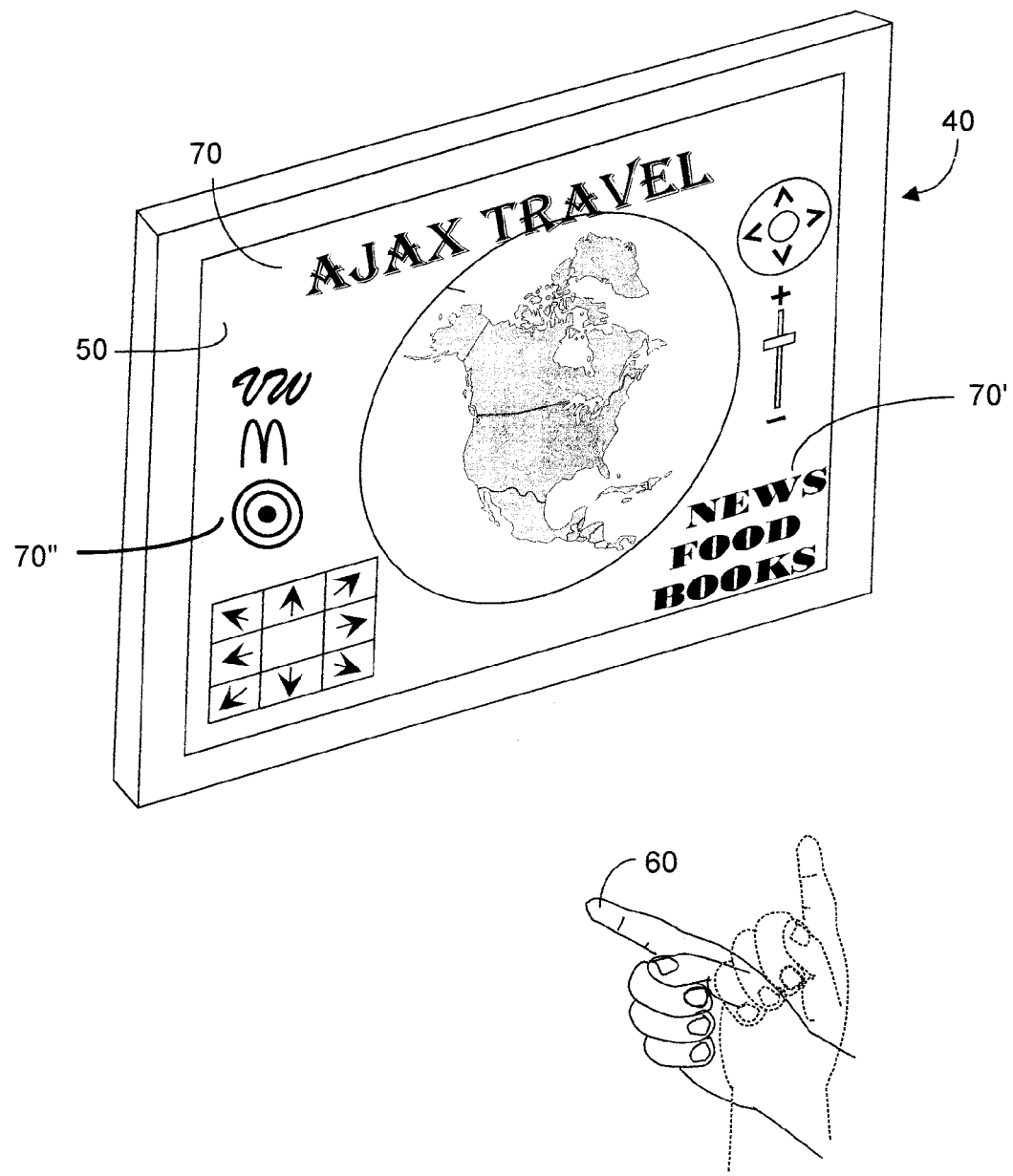
FIG. 1D shows a device such as shown in FIG. 1A or 1B whose display includes ads and logos with which the user may select or otherwise interact with using natural gestures, according to embodiments of the present invention.

FIG. 1D shows device 40 with two iterative ads 70, 70' and ad logos 70" presented on device display 50, with which ads user 60 can interact using natural user gestures. For example if the user is thinking of vacation, he/she can literally point to a location on the map displayed on the device associated with ad 70. The display also includes scrolling features and a sliding scale that may be used to rate the ad, e.g., + is very good, − is not of interest, or with a different gesture the user can use the sliding scale to zoom in or out on what is displayed, simply with an appropriate hand gesture. On the other hand if the user has no present interest in travel ad 70, he/she might point with a finger towards ad 70', which lists alternatives to travel ads. Indeed ad 70' might be a menu scrollable simply by user 60 moving a forefinger up or down in three-dimensional space before device 40. As described later herein with respect to FIG. 6, logos 70" are a shorthand way to alert user 60 to potential ads that will appear during the presently broadcast content, and allow the user to make a selection, e.g., perhaps selecting the VW logo if the user is thinking of purchasing a car, or selecting the McDonalds logo if the user is hungry and wants to learn what new food items might be available at McDonalds, etc. Details of these various natural user interface interactions may be found in cited Aquifi U.S. Pat. No. 8,854,433.

Figure 2:
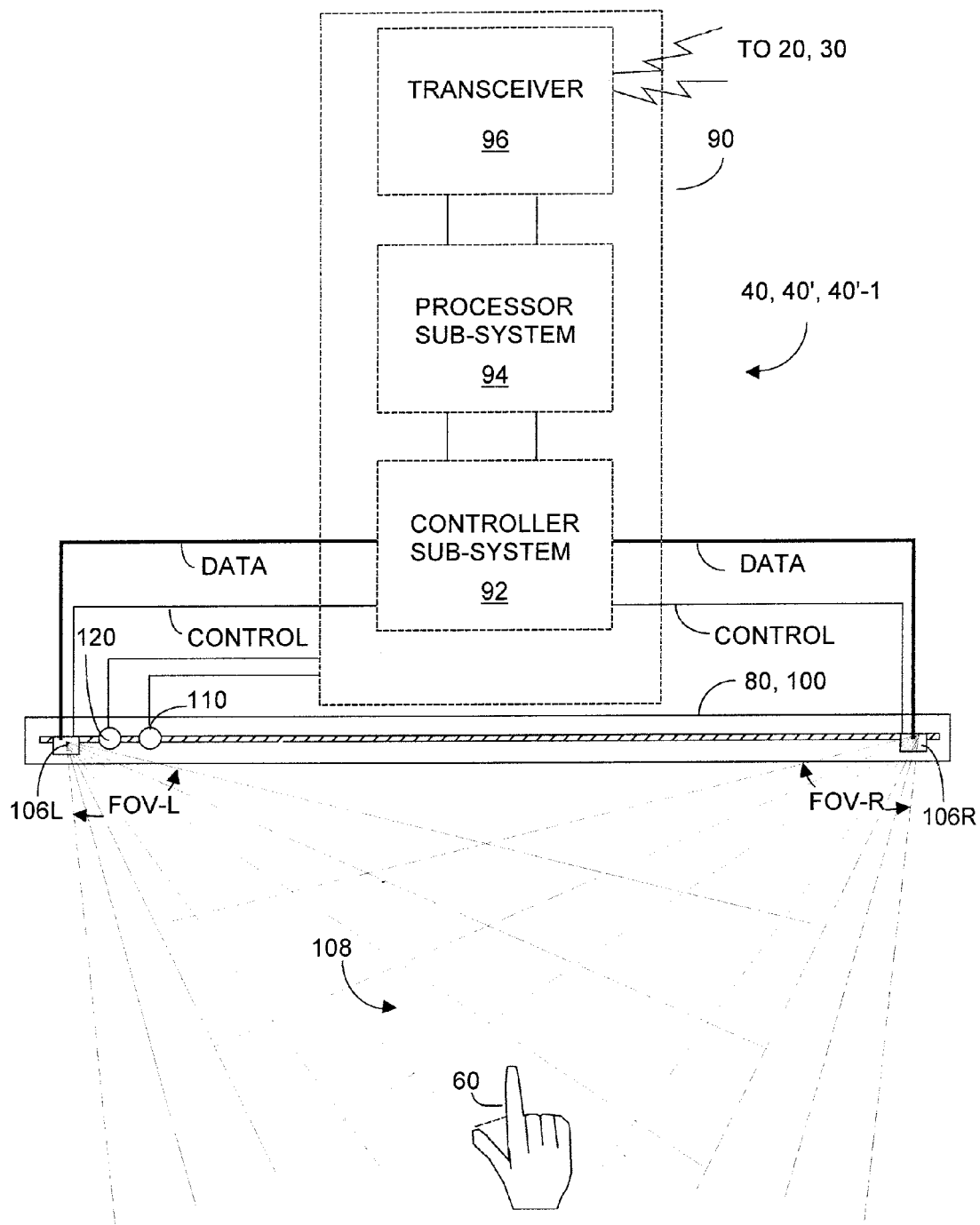
FIG. 2 is a block diagram of an acquisition system comprising two two-dimensional cameras device used to acquire natural user gestures responsive to user viewing of broadcast ads, according to embodiments of the present invention.

FIG. 2 is a generalized block diagram of devices 40, 40', 40'-1. Acquisition system 80 comprises an optical system 100 that includes spaced-apart two-dimensional cameras 106L, 106R. Lines radiating outward from each camera define the camera three-dimensional FOV and the intersection of FOV-L and FOV-R defines three-dimensional hover zone 108. Target object 60, here a user's hand, will be imaged by cameras 106L, 106R as it is within hover zone 108.

As detailed in the referenced Aquifi patents, cameras 106L, 106R preferably operate under command of control sub-system 92 within processor-controller-I/O system 90. Optical imagery acquired by cameras 106L, 106R is coupled to sub-system 92 via a DATA bus, and control signals that govern camera operation are coupled via a CONTROL bus. The optical data is rapidly processed by processor sub-system 94, which discerns landmarks and determines what gesture(s) have been acquired, and the analyzed gesture result is coupled to transceiver 96 within processor-controller-I/O system 90. Output from microphone 110 and (if present) output from gyro-accelerometer sensor 120 is also coupled to within processor-controller-I/O system 90 for detection and processing to determine the user gesture acquired as a stand-alone acquisition and/or to augment optically acquired or detected user gesture determination. Words explicitly uttered by the user as a gesture response or to augment a gesture response, e.g., "yes", "more", "boring", "no", etc. may be analyzed for content by a speech recognition module within the device. Ultimately the ascertained gesture response(s) will be sent via transceiver 96 to media broadcasting system 20, perhaps via cloud or server 30. Transceiver 96 may but need to be part of the signal path for incoming media broadcast from media broadcasting system 20. The incoming media and any ad(s) 70 therein will be presented on display screen 50 associated with device 40 and if there is audio content, the audio content will be played through the audio speaker associated with device 40.

Figure 3:
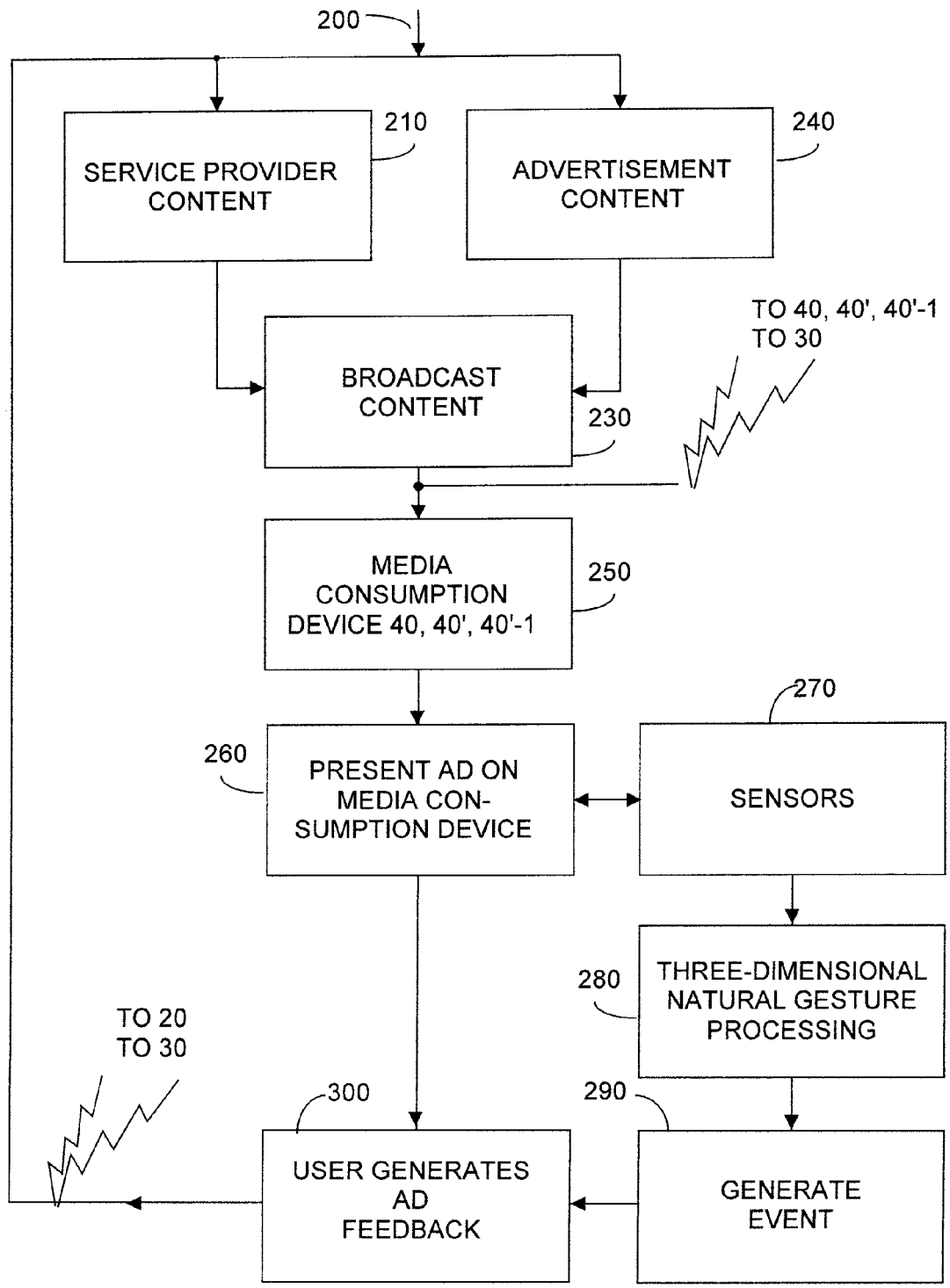
FIG. 3 is a block diagram showing functional interplay between a media broadcast system and a user device, according to embodiments of the present invention.

FIG. 3 depicts the interplay between media broadcast media system 20 and user device 40 in assembling and broadcasting media with ads. In FIG. 3, at step 200 media content, perhaps an automobile talk show, a sports show, a news article, a TV show, an Internet broadcast or stream, a social media message, a game, email, etc. is delivered from a media service provider. At step 210, the media service provider contributes the media content stream for use at method step 230, where the content stream may be augmented with a stream of advertising content from step 240. Preferably the advertising content stream contributed at step 240 for broadcast is somewhat tailored to account for factors such as the type of underlying content, e.g., a football game, a ballet, etc., the potential audience viewing the media, present market conditions, time/date factors, user preferences, previously accumulated profile history, if any, for anticipated users, etc. The ad content is interleaved or streamed with the normal media content (e.g., the media without ads) and the combined stream is then broadcast, wirelessly or via wire, to user devices such as device 40, 40', 40'-1 in FIG. 1A and FIG. 1B for user viewing (and hearing). Method steps 200, 210, 230, 240 preferably occur within media broadcaster system 20 (see FIG. 1A, FIG. 1B). Following step 230 broadcast of the assembled media content is made with transceiver 28 in media broadcasting system 20.

Step 250 refers to user device 40, which at step 260 presents the broadcast media whose content was assembled at step 230. The content is received directly from media broadcast system 20 or via server(s) or cloud 30, by a transceiver within processor-controller-I/O system 90 in the user device. At step 260 the broadcast content, which includes ad 70, is presented on the device. The content presentation includes visible content viewable on device screen 50, and audible to the user from the audio system, e.g., a speaker, associated with device 40, 40', 40'-1. As the media plays on the device, the user is free to anonymously interact and respond, using natural user gestures made in hover zone 08, uttering audible sound, and/or with physical manipulation of the device if handheld such as device 40', 40'-1. As described, device 40 includes an acquisition system 80 with an optical acquisition system 100 to acquire user gestures, and preferably also include a microphone 100 to acquire audible user made sounds, and if handheld (e.g., 40) a gyro-accelerometer sensor 120 to detect user manipulations of the device. Step 270 in FIG. 3 denotes the acquisition of the user responses by device 40, 40', 40'-1, and step 280 denotes the processing with the device by processor sub-system 94 in the device. Thus as the content media including ads such as 70 is presented on the device the user may freely interact with the content. Media broadcast system 20 knows when in time ads are broadcast such that any user response to the underlying content media can be ignored if not occurring during the time of an ad presentation.

Device 40 enables users to make a rich assortment of gestures with which to interact with broadcast ads such as ad 70. The user may perform a gesture in hover zone 108 to halt or pause the ad being broadcast, or to skip the ad, or to speed-up the ad, or create a reminder to enable the ad to be viewed later. For example, a "remind me later" gesture may, within device processor sub-system 94, map a simple code number that is fed back from the user device perhaps via server(s) or cloud 30 to media broadcast system 20 for use by the sponsor or the ad generator contributing the ad content at step 240. Step 290 in FIG. 3 denotes the interpretation of a user response by the device, perhaps a simple code as noted above, and step 300 represents the broadcasting by device 40 back to steps 210, 240 of the user feedback. It will be appreciated that communications from the user device to the media broadcast system can be rather brief, and will be devoid of information that might be used by hackers or others to uniquely identify the user 40 who made the gestures and responses now being fed back to media broadcast system 20. Media broadcast system 20 receives the fed back events representing interpreted responses from a user or a group of users, whereupon at step 240 the ad provider can modify the ad content if called for and produce an updated broadcast, responsive to the user feedback.

Figure 4:
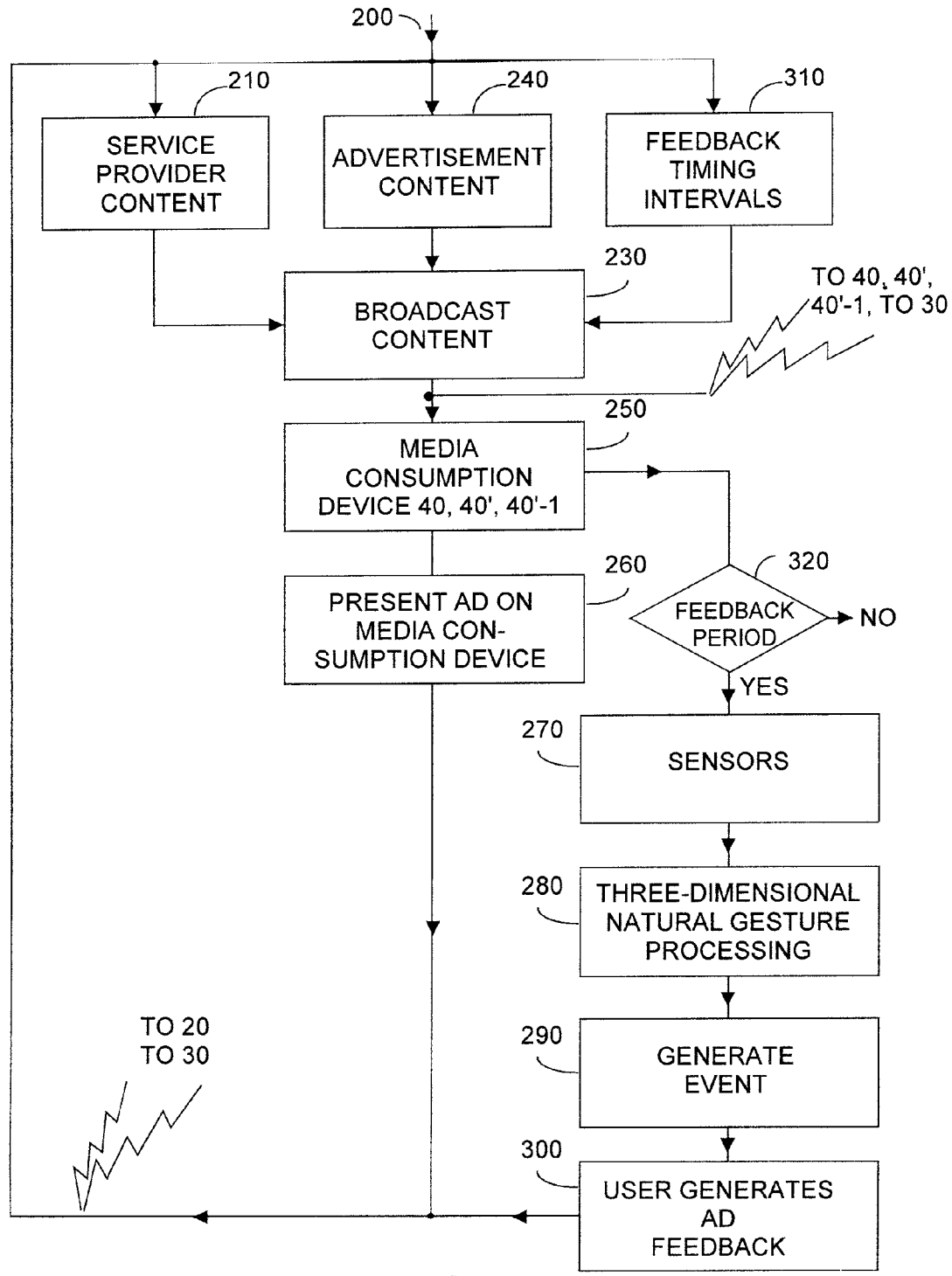
FIG. 4 is a block diagram showing functional interplay between a media broadcast system with feedback timing intervals and a user device, according to embodiments of the present invention.

FIG. 4 is a block diagram of an alternative embodiment of the present invention that broadcasts timing intervals that alert the user device when in time ads are being broadcast. Blocks in FIG. 4 (and indeed in each of FIG. 5, FIG. 6, FIG. 7, and FIG. 8) labeled with the same reference numerals as blocks in FIG. 3 perform substantially identical functions as similarly numbered blocks in FIG. 3. FIG. 4 shows the inclusion of a feedback timing interval block 310. According to embodiments of the present invention, when assembling the broadcast content as step 230 for broadcast, timing intervals can be interwoven with signals broadcast from system 20 that represent start and stop times when ads are broadcast as part of the media content. Thus at block 250 user device 40 will receive timing information in addition to the broadcast content (and ads), which timing information can be used in deciding whether device 40 should at specific times process acquired user responses to what is presented on device 40. At step 320 user responses made other than during time intervals that a broadcast ad is actually being presented can be ignored, and not processed, and at step 300 no user feedback is transmitted from device 40 to server or cloud 30 to media broadcast system 20. However if method step 320 determines that at this particular time an ad is being presented on device 40, then normal acquisition and processing of user responses is carried out within device 40. Thus since what user responses are being detected are responsive to ads and not to the general content being broadcast, perhaps a football game, user generated feedback is created and is broadcast at step 300.

Figure 5:
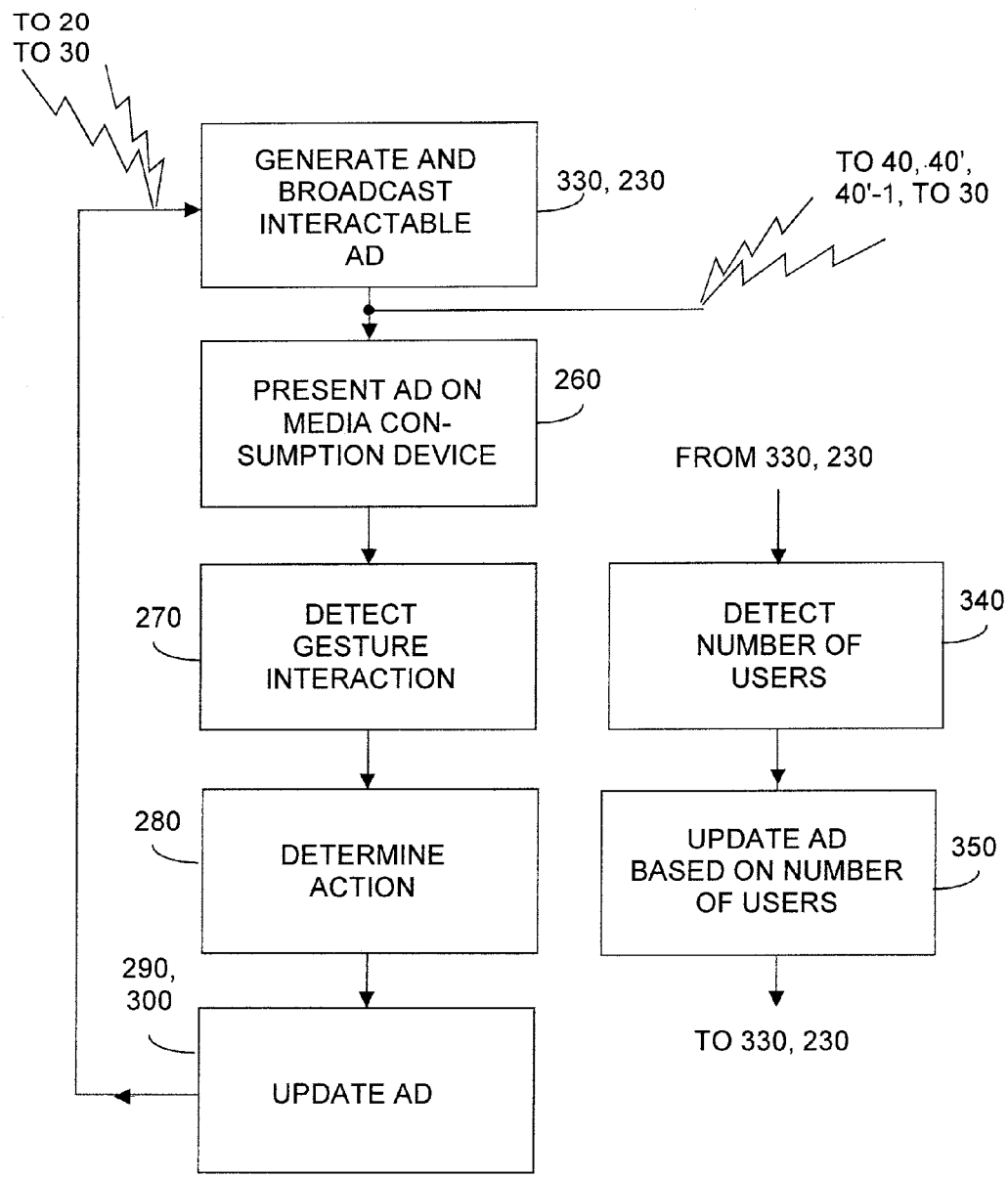
FIG. 5 is a block diagram showing functionality of a media broadcast system with explicit user prompts and a user device, according to embodiments of the present invention.

It will be appreciated that the embodiment of FIG. 4 puts less strain on device 40 resources, including consumption of operating power, in that signal processing of user generated responses within device 40 need not occur until a time interval corresponding to an ad being broadcast occurs. Thus the only user feedback generated from the embodiment of FIG. 4 will occur responsive to ads. By contrast, user feedback generated from the embodiment of FIG. 3 could include response to exciting or perhaps boring portions of the broadcast content including content portions devoid of ads. Such an embodiment might be more useful to the broadcast content producer or director, rather than the ad creator FIG. 5 is a block diagram of an alternative embodiment of the present invention in which iterative ads with explicit prompts are broadcast and presented to a user. In an attempt to make ads more interesting and thus more informative to users, the embodiment of FIG. 5 enables users to interact with and customize ads in realtime. The intended result is that users will find the ad presentation more interesting, perhaps having a game like play feature, and will have more ads presented that best fit their interest and needs, rather than see typical ads intended for the mass market.

At step 330, 230 in FIG. 5, media broadcasting system 20 generates and then broadcasts an ad to device 40, which ad may be tailored upon prior knowledge of the user, albeit without knowledge of the user's true identity, to preserve user anonymity. For example it may be known to system 20 or the ad provider that the user is an adult male who likes to view basketball matches. At step 260 the ad, perhaps ad 70, is presented on user device 40, whereupon the user is encouraged to use gestures to improve the ad, perhaps a hand thumbs up or thumbs down gesture to instantly rate the ad. At step 270 the just made user gesture(s) are acquired and at step 280 are processed and analyzed within device 40. The gesture may have been made, without limitation, to pause the ad, to rate the ad, perhaps advancing to presentation of a next broadcast ad, etc. FIG. 1D depicted interactive type ads 70, 70' that allowed the user to select which ad seemed more relevant. Further the use could make choices and otherwise interact with the ads using natural user gestures acquired by device 40, e.g., perhaps pointing to the slider scale on the right side of FIG. 1D to indicate relating liking of an ad pointed to by the user. At step 290, 300 in FIG. 5, user device 40 generates a relevant code identifying the interpreted gesture, whereupon the response code is broadcast by device 40 to media broadcasting server 20 and server or cloud 30. At step 330, 230 the ad is updated using the realtime user feedback just received, and a new ad or modified version of the present ad is broadcast by media broadcasting system 20 to device 40. Interactive ads such as shown in FIG. 1D can be presented in a game-like environment. For example users may accumulate "points" by exploring different regions of the ad presented on their device using gestures and perhaps earn a discount coupon toward purchase of what the ad is promoting. For example if as in FIG. 1D the ad promotes travel, perhaps a discount coupon can be earned by the user's exploring different countries on the ad map, e.g., by pointing with a finger to the countries or using the thumb and forefinger to zoom in on the displayed map (the thumb and forefinger gesture being made without having to touch the device display screen).

It will be appreciated that multiple users may respond to the same ad, using individual devices 40. For example referring to FIG. 1D one user may wish to travel to New England, and another user may wish to travel to England, which would require that user to scroll the displayed map to show England. Within media broadcasting system 20, method step 340 in FIG. 5 can track the number of users responding to the present ad, and at step 350 the ad can be updated such that if a large number of users wish to see England, the display in FIG. 1D might be modified to show the U.S. as well as England. Alternatively if a sufficiently large fraction of users respond to the ad by wanting to see England, software if media broadcast system 20 can simply make the ad or the immediately following ad feature England, as displayed on the user devices.

It will further be appreciated that in devices 40 equipped or authorized to broadcast the user's present position, ads may be customized to take into account the user location. If device 40' is currently with user 60 in a mall shopping area, ads can be customized to present on the device ads promoted by sponsors doing business in the mall. If user device 40' location is determined to be seaside, ads relevant to such activity may be broadcast to the user, e.g., suntan lotion products, sunglass products, etc. It is noted that the ability of devices 40, 40' to acquire gesture information enables the device to know how far from the device display is the user position. For example, for a physically large device 40 as depicted in FIG. 1A, if the distance to the user as determined by device 40 is several feet, then presumably device 40 is substantially larger than a handheld cell phone or tablet type device 40'. This distance parameter can be broadcast by device 40, 40' to media broadcast system 20, which can generate ads with default zoom levels appropriate to the assumed display screen size for the device. For example if the user is say three meters from device 40, as determined from device acquisition of user location as part of the natural gesture acquisition process, system 20 can cause relatively large fonts or icons or images to be generated as part of presented ad 70.

As was noted with respect to FIG. 1D, advertisers may wish to allow a user to decide between alternative ads, e.g., 70, 70', as to which seems more relevant or interesting, and indeed may present an ad menu 70' enabling the user to pick from a list of ad categories. Such user interaction preferably is made using natural user gestures that are acquired by the user device, and communicated back to the ad broadcaster, e.g., system 20. User selected ads are generally believed to be more effective and less annoying to users.

Figure 6:
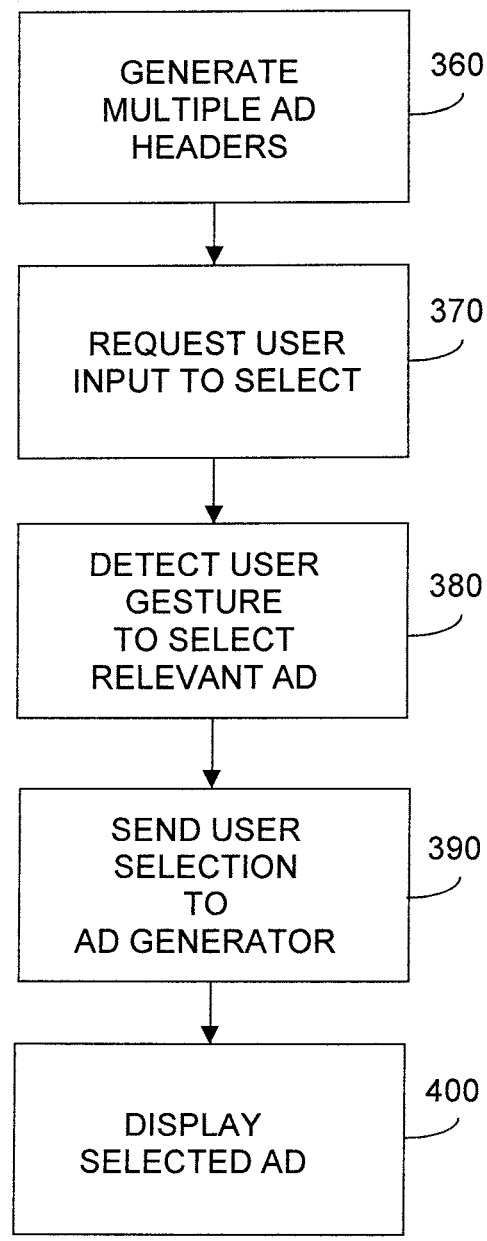
FIG. 6 is a block diagram showing use of ad headers to facilitate user selection of what ads shall appear during broadcast content, according to embodiments of the present invention.

Referring now to FIG. 6, it is possible for media broadcast system 20 to expedite presentation of potential ads on the user device. Normally ads are interspersed between normal media content, perhaps a broadcast football game, a play, news show, etc. System 20 can generate at step 360 multiple ad headers that can be presented on display 50 of device 40, such as logos 70" in FIG. 1D. Step 370 in FIG. 6 prompts the user to make a logo selection. If the user fails to make a selection, system 20 will broadcast a default ad, presumed to be a good choice for this user.

The logo abbreviated preview of potential ads enables user 60 to use gestures to point to or otherwise select a logo displayed on screen 50 of device 40. Other modes of selection may include moving a cursor displayed on device 40 to the logo or other symbol of interest, by pointing a user finger, and then perhaps clenching the user hand, to indicate "select" to device 40. Of course numbers could appear by each logo, e.g., 1, 2, 3, ..., and the user might designate a logo by holding up a number of fingers to make the logo selection. At step 380, acquisition system 80 in device 40 rapidly ascertains the number of fingers so held, and causes at step 390 the logo selection to be broadcast back to the ad generator portion system 20. Finally at step 400 in FIG. 6, during the commercial break period in the broadcast, an ad corresponding to the selected logo is presented on the display of device 40 for user 40.

Figure 7:
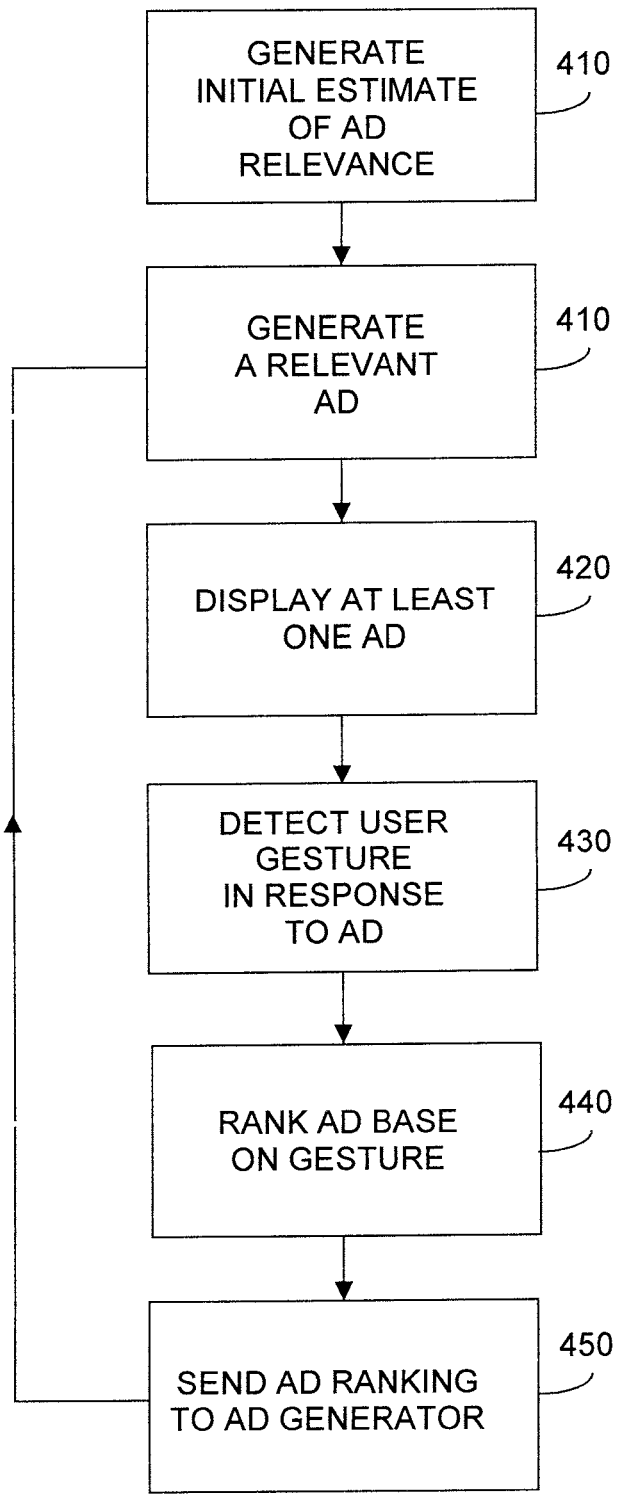
FIG. 7 is a block diagram depicting ad ranking to determine higher relevancy ads, according to embodiments of the present invention.

FIG. 7 is a block diagram of an embodiment of the present invention that uses ad ranking to select and broadcast a most relevant ad for a user, an ad to which the user will react positively. Some advertising companies gather passive data from various sources for users, including shopping and web browsing histories. Such profile type data can be anonymized in that the ad company may know that customer xyz.@abc.com shops for hunting and fishing gear, and web surfs primary on websites that feature the great outdoors. It is not necessary that the ad producer (or ad sponsor) gathering such information know the true identity of such user, especially for use with embodiments of the present invention. In some of the embodiments previously described herein, the user can actively select amongst ads for a more interesting ad. But if the user chooses not to make a selection, what type ads should be presented on the user's device.

In some instances the user may use natural gestures to perhaps point towards an ad or ads or icon or icons or other indicia on the device display screen, but then decide not to affirmatively select an ad or icon, e.g., by not making a "select" type gesture. Indeed the user may not know that such potential, latent or nascent interest evidenced by his/her device interaction, e.g., pointing to an ad or icon on the device display, communicates potentially useful information to system 20. Such potential explicit and accurate albeit nascent or latent interest on the user's part in an ad is nevertheless useful to media broadcast system 20 and the sponsor of the ad in ranking ads and generating future ads for this user. The burden upon the user to provide, intentionally or otherwise, this valuable information to the ad sponsor is nil: simply a thumbs up/thumbs down type gesture, a head shake gesture, or the like can suffice. This is but another example of the win-win nature of the present invention: both sides benefit at little or no cost.

What might be termed nascent or latent user ad ranking is shown in the block diagram of FIG. 7. At step 410, media broadcast system 20 generates an initial estimate of relevancy of an ad for the user. A catalog of potential ads can be quantified by system 20 with respect to relevancy for the specific user. The estimate may be based on some sort of history profile, or may simply be a guess. At step 410, system 20 generates an ad deemed relevant for the user. The selected potentially relevant ad is then broadcast by system 20 to the user device. Whatever response gesture if any the user makes upon seeing the ad is acquired and processed by device 40 and is broadcast back to system 20. Within system 20, at step 430 the user response gesture is received by system 20 and at step 440 the ad at which the user perhaps pointed is ranked, based upon the nature of the user gesture. This ranking at step 450 is then passed back to step 410 where a different ad, perhaps more relevant, is generated based upon such nascent feedback as was received from the user device. Of course, a continuous level of raking across many ads can be developed in this fashion and used to generate improvements on the current ad or new ads, believed to be more relevant to the user. Such latent type ad ranking is in addition to the user explicitly selecting ads, which selections of course are used to help rank ads.

Figure 8:
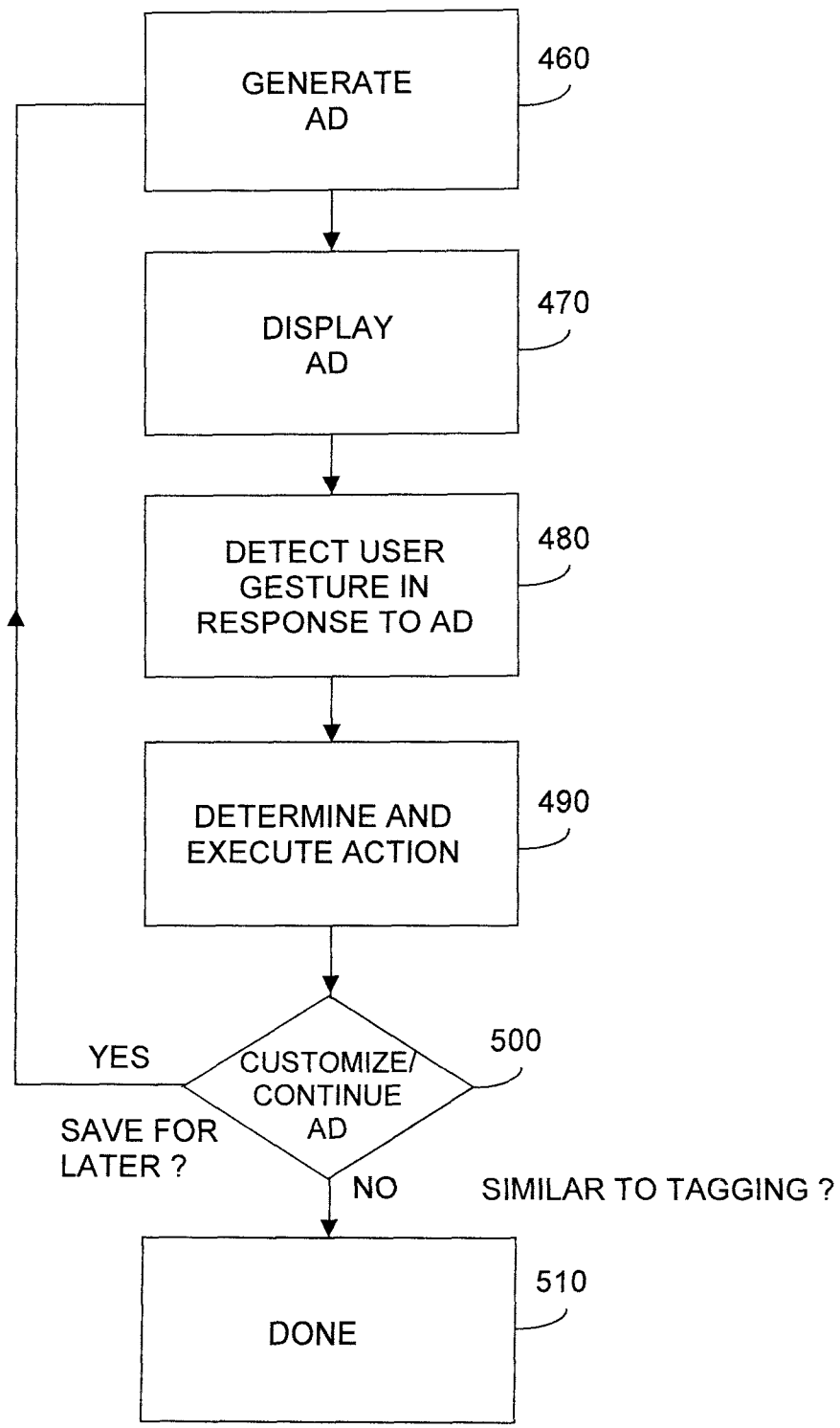
FIG. 8 is a block diagram depicting use of a "save for later" gesture in halting a presently presented ad, for representation at a later time, according to embodiments of the present invention.

FIG. 8 is a block diagram depicting use of acquired user gestures to indicate a presented ad should be saved for later presentation on the user device. At step 460 media broadcast system 20 generates an ad from the ad agency or content provider, based on any user feedback or other historical knowledge for the user. At step 470 this ad is presented on device 40, perhaps ad 70 in FIG. 1A. The user may decide he/she is very interested but would like to see the ad at some later date or time. A gesture can be defined, known to user 60, to device 40, and to system 20 signaling this user intent, e.g., to see the same ad but at a later occasion. Without limitation such "save for later" gesture might be the user's hand drawing a circle (emulating a clock), or if display screen 50 has an icon of a shopping cart, the user save the ad for later by clicking and selecting the shopping cart, e.g., perhaps by finger pointing to the cart, and then clenching the fist to mean select, the cart icon. The user makes such gesture, which is acquired and by device 40 at step 480, and the relevant code for "save for later" is determined at step 490 by device 40 and broadcast by device 40 to system 20. Within system 20, step 500 notes receipt or non-receipt of a "save for later" gesture. If no such gesture is received, step 500 branches back to step 460 and ad presentation continues. However if step 500 determines a "save for later" gesture was received, ad customization terminates at step 510, and no further ad customization occurs at this time.

Embodiments of the present invention have been described with respect to acquiring user response to ads in broadcast media content, and feeding back such responses to the broadcast sponsor. It will be recognized, however, that producers and directors of the underling media content may also benefit from user feedback generated during the regular, not ad, media content broadcast. Perhaps a first scene in a broadcast play receives substantial negative feedback from users. Such information provided by the present invention can enable the producers and directors to learn why might be done to rewrite the scene or recast actors in the scene, etc. for a more positive review in subsequent broadcasts.

Modifications and variations may be made to the disclosed embodiments without departing from the subject and spirit of the invention as defined by the following claims.

What is claimed is:

1. A method to enable a broadcaster of media that includes at least one ad with at least two indicia representing sponsored products, to obtain realtime feedback responses from at least one user viewing the media on a device having a display on which said indicia will appear, the method including the following steps:

(a) enabling said device to acquire in realtime gestures of a user made in response to viewing said media on said device, wherein said user can gesture at a user chosen one of said indicia displayed on said device to select an ad said user wishes to see presented on said device, said gestures being acquired so as to be inherently devoid of user identity to preserve anonymity of said user during and after acquisition of said gestures;

(b) processing in realtime within said device gestures acquired at step (a) to identity therefrom user responses to said media;

(c) broadcasting in realtime from said device processed gestures identified at step (b) to said broadcaster;

(d) said broadcaster receiving and analyzing in realtime processed gestures broadcast at step (c) to ascertain therefrom user response toward said at least one ad;

(e) said broadcast communicating analysis from step (d) in realtime to a sponsor of said at least one ad to enable said sponsor to carry out at least one action selected from a group consisting of (i) modify at least a portion of said ad in realtime if user gestures analyzed at step (d) suggest so doing will make a subsequent ad broadcast to be more relevant to said user, (ii) pause said at least one ad if user response so indicates, (iii) reschedule said at least one ad for broadcast later during media broadcast if user response so indicates, (iv) select another ad to be broadcast at this time to said at least one user, (v) select another ad to be broadcast later in time to said at least one user, and (vi) provide analysis from step (d) to a profile history of said at least one user, said profile history useable in determining future ads to be broadcast to said at least one user;

wherein an ad corresponding to the one of said indicia chosen at step (a) by said user is broadcast to said at least one device for presentation to said user; and said user can cause at least one ad in media presented on said display to be customized to increase ad relevancy for said user, while at all times preserving user anonymity.

2. The method of claim 1, wherein step (a) includes enabling said device to acquire in realtime natural user gestures made by said at least one user in a three-dimensional (x,y,z) space defined within an acquisition zone of said device, where z>0.

3. The method of claim 1, wherein step (b) includes providing said device with at least first and second spaced-apart two-dimensional cameras disposed to optically acquire in realtime said natural user gestures made by said at least one user within a three-dimensional (x,y,z) hover zone, where z>0.

4. The method of claim 1, wherein step (b) includes identifying at least one user made gesture selected from a group consisting of (i) a gesture signifying approval, (ii) a gesture signifying disapproval, (iii) a gesture signifying neutrality, (iv) a gesture made to interact with said at least one ad presented on said display of said device, (v) a gesture made to interact with a portion of media presented on said display of said device, (vi) a gesture made to select an option associated with said at least one ad presented on said display of said device, (vii) a gesture made to pause presentation of said at least one ad presented on said display of said device, (viii) a gesture made to affect at least one characteristic of said at least one ad presented on said display of said device, (ix) a gesture made to affect at least a portion of media presented on said display of said device, and (x) a gesture made to cause said at least one ad to be rescheduled and viewed on said display of said device later during broadcast of said media.

5. The method of claim 1, wherein:
what is acquired at step (a) includes partial gestures made by said at least one user, which partial gestures are nascent in not having been completed yet still indicate potential interest by said at least one user in an ad presented on said device; and broadcasting at step (c) includes broadcasting processed gestures including processed such partial gestures.

6. The method of claim 1 wherein said broadcaster of media broadcasts media including time information identifiable to said at least one device to signify start and stop of ad content in media broadcast by said broadcaster;

wherein step (b) includes at least reducing full processing of media received by said device until said device receives a start ad signal in said media, whereupon full processing by said device of media occurs until said device receives a stop ad signal in said media; and wherein resources of said device are preserved.

7. The method of claim 1, wherein at step (a) said device has a characteristic selected from a group consisting of (i) said device is hand holdable, (ii) said device is a smartphone, (iii) said device is a computer tablet, (iv) said device is an IoT device, (v) said device is a computer, (vi) said device is a TV receiver; (vii) said device is an entertainment center, and (viii) said device is a set top box.

8. The method of claim 1, wherein step (a) further includes enabling said device to further acquire at least one of (i) audible sounds made by said at least one user while viewing said media on said device, (ii) word recognition of audible sounds that are words made by said at least one user while viewing said media on said device, and (iii) user manipulation of said device made while viewing said media on said device;

wherein recognition of natural gestures made by said user is augmented with information obtained from at least one of audible sounds and manipulation of said device, made by said user while viewing said media on said device.

9. A method to enable a broadcaster of media that includes at least one ad to obtain realtime feedback responses from at least one user viewing the media on a device having a display, the method including the following steps:

(a) providing said device with a system to acquire in realtime gestures of a user made in response to viewing said media on said device, said gestures including partial gestures made by said at least one user, which partial gestures are nascent in not having been completed yet still indicate potential interest by said at least one user in an ad presented on said device, said gestures being acquired so as to be inherently devoid of user identity to preserve anonymity of said user during and after acquisition of said gestures, said system including at least spaced-apart first and second two-dimensional cameras whose overlapping fields of view define a hover zone within which said gestures are detectable by said device;

(b) enabling said device to process in realtime gestures acquired at step (a) by said first and second two-dimensional cameras to identity therefrom user responses to said media, said process using landmark points definable on at least an acquired region of said user;

(c) enabling said device to broadcast in realtime processed gestures, including processed such partial gestures, identified at step (b) to said broadcaster;

(d) said broadcaster receiving and analyzing in realtime processed gestures broadcast at step (c) to ascertain therefrom user response toward said at least one ad, and communicating such analysis in realtime to a sponsor of said at least one ad;

wherein said sponsor is enabled to carry out at least one action selected from a group consisting of (i) modify at least a portion of said ad in realtime if user gestures analyzed at step (d) suggest so doing will make a subsequent ad broadcast to be more relevant to said user, (ii) pause said at least one ad if user response so indicates, (iii) reschedule said at least one ad for broadcast later during media broadcast if user response so indicates, (iv) select another ad to be broadcast at this time to said at least one user, (v) select another ad to be broadcast later in time to said at least one user, and (vi) provide analysis from step (d) to a profile history of said at least one user, said profile history useable in determining future ads to be broadcast to said at least one user; and wherein said user can cause at least one ad in media presented on said display to be customized to increase ad relevancy for said user, while at all times preserving user anonymity.

10. The method of claim 9, wherein step (b) includes identifying at least one user made gesture selected from a group consisting of (i) a gesture signifying approval, (ii) a gesture signifying disapproval, (iii) a gesture signifying neutrality, (iv) a gesture made to interact with said at least one ad presented on said display of said device, (v) a gesture made to interact with a portion of media presented on said display of said device, (vi) a gesture made to select an option associated with said at least one ad presented on said display of said device, (vii) a gesture made to pause presentation of said at least one ad presented on said display of said device, (viii) a gesture made to affect at least one characteristic of said at least one ad presented on said display of said device, (ix) a gesture made to affect at least a portion of media presented on said display of said device, and (x) a gesture made to cause said at least one ad to be rescheduled and viewed on said display of said device later during broadcast of said media.

11. The method of claim 9, wherein at least one ad broadcast by said broadcaster of media includes at least two indicia representing sponsored products, which indicia will appear on a display of said at least one device;
   at step (a) a user can gesture at a user chosen one of said indicia displayed on said device to select an ad said user wishes to see presented on said device; and
   at step (e) an ad corresponding to the one of said indicia chosen at step (a) by said user is broadcast to said at least one device for presentation to said user.

12. The method of claim 9 wherein said broadcaster of media broadcasts media including time information identifiable to said at least one device to signify start and stop of ad content in media broadcast by said broadcaster;
   wherein step (b) includes at least reducing full processing of media received by said device until said device receives a start ad signal in said media, whereupon full processing by said device of media occurs until said device receives a stop ad signal in said media; and
   wherein resources of said device are preserved.

13. The method of claim 9, wherein at claim (a) said device has a characteristic selected from a group consisting of (i) said device is handholdable, (ii) said device is a smartphone, (iii) said device is a computer tablet, (iv) said device is an IoT device, (v) said device is a computer, (vi) said device is a TV receiver, (vii) said device is an entertainment center, and (viii) said device is a set top box.

14. The method of claim 9, wherein step (a) wherein step (a) further includes enabling said device to further acquire at least one of (i) audible sounds made by said at least one user while viewing said media on said device, (ii) word recognition of audible sounds that are words made by said at least one user while viewing said media on said device, and (iii) user manipulation of said device made while viewing said media on said device;
   wherein recognition of natural gestures made by said user is augmented with information obtained from at least one of audible sounds and manipulation of said device, made by said user while viewing said media on said device.

15. A method to enable a broadcaster of media that includes at least one ad to obtain realtime feedback responses from at least one user viewing the media on a device having a display, said media broadcast including time information identifiable to said at least one device to signify start and stop of ad content in media broadcast by said broadcaster, the method including the following steps:
   (a) enabling said device to acquire in realtime gestures of a user made in response to viewing said media on said device, said gestures being acquired so as to inherently preserve anonymity of said user;
   (b) processing in realtime within said device gestures acquired at step (a) to identify therefrom user responses to said media, said processing including at least reducing full processing of media received by said device until said device receives a start ad signal in said media, whereupon full processing by said device of media occurs until said device receives a stop ad signal in said media; wherein resources of said device are preserved;
   (c) broadcasting in realtime from said device processed gestures identified at step (b) to said broadcaster;
   (d) said broadcaster receiving and analyzing in realtime processed gestures broadcast at step (c) to ascertain therefrom user response toward said at least one ad;
   (e) said broadcast communicating analysis from step (d) in realtime to a sponsor of said at least one ad to enable said sponsor to carry out at least one action selected from a group consisting of (i) modify at least a portion of said ad in realtime if user gestures analyzed at step (d) suggest so doing will make a subsequent ad broadcast to be more relevant to said user, (ii) pause said at least one ad if user response so indicates, (iii) reschedule said at least one ad for broadcast later during media broadcast if user response so indicates, (iv) select another ad to be broadcast at this time to said at least one user, (v) select another ad to be broadcast later in time to said at least one user, and (vi) provide analysis from step (d) to a profile history of said at least one user, said profile history useable in determining future ads to be broadcast to said at least one user;
   wherein said user can cause at least one ad in media presented on said display to be customized to increase ad relevancy for said user, while at all times preserving user anonymity.

16. The method of claim 15, wherein step (b) includes providing said device with at least first and second spaced-apart two-dimensional cameras disposed to optically acquire in realtime said natural user gestures made by said at least one user within a three-dimensional (x,y,z) hover zone, where z>0.

17. The method of claim 15, wherein step (b) includes identifying at least one user made gesture selected from a group consisting of (i) a gesture signifying approval, (ii) a gesture signifying disapproval, (iii) a gesture signifying neutrality, (iv) a gesture made to interact with said at least one ad presented on said display of said device, (v) a gesture made to interact with a portion of media presented on said display of said device, (vi) a gesture made to select an option associated with said at least one ad presented on said display of said device, (vii) a gesture made to pause presentation of said at least one ad presented on said display of said device, (viii) a gesture made to affect at least one characteristic of said at least one ad presented on said display of said device, (ix) a gesture made to affect at least a portion of media presented on said display of said device, and (x) a gesture made to cause said at least one ad to be rescheduled and viewed on said display of said device later during broadcast of said media.

18. The method of claim 15, wherein:
   what is acquired at step (a) includes partial gestures made by said at least one user, which partial gestures are nascent in not having been completed yet still indicate potential interest by said at least one user in an ad presented on said device; and broadcasting at step (c) includes broadcasting processed gestures including processed such partial gestures.

19. The method of claim 15, wherein at least one ad broadcast by said broadcaster of media includes at least two indicia representing sponsored products, which indicia will appear on a display of said at least one device;
- at step (a) a user can gesture at a user chosen one of said indicia displayed on said device to select an ad said user wishes to see presented on said device; and
- at step (e) an ad corresponding to the one of said indicia chosen at step (a) by said user is broadcast to said at least one device for presentation to said user.

20. The method of claim 15, wherein at step (a) said device has a characteristic selected from a group consisting of (i) said device is handholdable, (ii) said device is a smartphone, (iii) said device is a computer tablet, (iv) said device is an IoT device, (v) said device is a computer, (vi) said device is a TV receiver, (vii) said device is an entertainment center, and (viii) said device is a set top box.

21. The method of claim 15, wherein step (a) includes enabling said device to acquire in realtime natural user gestures made by said at least one user in a three-dimensional (x,y,z) space defined within an acquisition zone of said device, where z>0.

22. A method to enable a broadcaster of media that includes at least one ad to obtain realtime feedback responses from at least one user viewing the media on a device having a display, the method including the following steps:
- (a) enabling said device to acquire in realtime natural user gestures, including partial gestures that are nascent in not having been completed yet still indicate potential interest by said at least one user in an ad presented on said device, of at least one user in a three-dimensional (x,y,z) space defined within an acquisition zone of said device, where z>0, made in response to viewing said media on said device, said gestures being acquired so as to inherently preserve anonymity of said user;
- (b) processing in realtime within said device gestures acquired at step (a) to identify therefrom user responses to said media;
- (c) broadcasting in realtime from said device processed gestures including processed such partial gestures identified at step (b) to said broadcaster;
- (d) said broadcaster receiving and analyzing in realtime processed gestures broadcast at step (c) to ascertain therefrom user response toward said at least one ad;
- (e) said broadcast communicating analysis from step (d) in realtime to a sponsor of said at least one ad to enable said sponsor to carry out at least one action selected from a group consisting of (i) modify at least a portion of said ad in realtime if user gestures analyzed at step (d) suggest so doing will make a subsequent ad broadcast to be more relevant to said user, (ii) pause said at least one ad if user response so indicates, (iii) reschedule said at least one ad for broadcast later during media broadcast if user response so indicates, (iv) select another ad to be broadcast at this time to said at least one user, (v) select another ad to be broadcast later in time to said at least one user, and (vi) provide analysis from step (d) to a profile history of said at least one user, said profile history useable in determining future ads to be broadcast to said at least one user;

wherein said user can cause at least one ad in media presented on said display to be customized to increase ad relevancy for said user, while at all times preserving user anonymity.

23. The method of claim 22, wherein step (b) includes identifying at least one user made gesture selected from a group consisting of (i) a gesture signifying approval, (ii) a gesture signifying disapproval, (iii) a gesture signifying neutrality, (iv) a gesture made to interact with said at least one ad presented on said display of said device, (v) a gesture made to interact with a portion of media presented on said display of said device, (vi) a gesture made to select an option associated with said at least one ad presented on said display of said device, (vii) a gesture made to pause presentation of said at least one ad presented on said display of said device, (viii) a gesture made to affect at least one characteristic of said at least one ad presented on said display of said device, (ix) a gesture made to affect at least a portion of media presented on said display of said device, and (x) a gesture made to cause said at least one ad to be rescheduled and viewed on said display of said device later during broadcast of said media.

24. The method of claim 22, wherein at least one ad broadcast by said broadcaster of media includes at least two indicia representing sponsored products, which indicia will appear on a display of said at least one device;
- at step (a) a user can gesture at a user chosen one of said indicia displayed on said device to select an ad said user wishes to see presented on said device; and
- at step (e) an ad corresponding to the one of said indicia chosen at step (a) by said user is broadcast to said at least one device for presentation to said user.

25. The method of claim 22, wherein at step (a) said device has a characteristic selected from a group consisting of (i) said device is handholdable, (ii) said device is a smartphone, (iii) said device is a computer tablet, (iv) said device is an IoT device, (v) said device is a computer, (vi) said device is a TV receiver, (vii) said device is an entertainment center, and (viii) said device is a set top box.

26. The method of claim 22, wherein said broadcaster of media broadcasts media including time information identifiable to said at least one device to signify start and stop of ad content in media broadcast by said broadcaster;

wherein step (b) includes at least reducing full processing of media received by said device until said device receives a start ad signal in said media, whereupon full processing by said device of media occurs until said device receives a stop ad signal in said media; and wherein resources of said device are preserved.

* * * * *